United States Patent Office 3,264,303
Patented August 2, 1966

3,264,303
PROCESS FOR THE MANUFACTURE OF YOHIMBANE-18-O-ETHERS
John Benjamin Ziegler, Summit, N.J., assignor to Ciba Corporation, New York, N.Y., a corporation of Delaware
No Drawing. Filed Jan. 27, 1965, Ser. No. 428,527
16 Claims. (Cl. 260—287)

This is a continuation-in-part application of my application Serial No. 357,802, filed April 6, 1964, now abandoned.

The present invention concerns a process for the preparation of 3-epi-20α-yohimbane compounds having the following nucleus

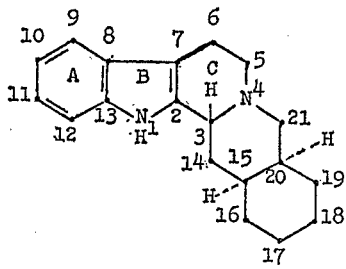

More particularly, it relates to a process for the preparation of 18α- or 18β-(R—CH$_2$—O)-17α-R$_2$-3-epi-20α-yohimbane-16β-carboxylic acid esters, in which R is hydrogen or an organic radical, and R$_2$ is primarily lower alkoxy, as well as cyano or N-lower alkanoyl-N-lower alkyl-amino, the salts, N-oxides or the salts of N-oxides thereof.

Several procedures for the preparation of the above-compounds are known, especially those described by Robison et al., J. Am. Chem. Soc., vol. 83, p. 2695 (1961), which involve:

(1) The treatment of an 18-hydroxy-17α-R$_2$-3-epi-20α-yohimbane-16β-carboxylic acid ester with an aliphatic diazo compound in the presence of a Lewis acid, or (2) Conversion of an 18-hydroxy-17α-R$_2$-3-epi-20α-yohimbane-16β-carboxylic acid ester into a corresponding 18-sulfonic acid ester thereof and alcoholysis of the resulting ester to form the desired 18α- or 18β-O-ether respectively Process (1) of the prior art involves the use of diazo-compounds, especially the gaseous lower diazo-alkanes, e.g., diazomethane or diazoethane, which reagents decompose easily, and are therefore, hazardous; if possible, reagents of that type should be avoided in large-scale operations. Process (2) involves the sulfonation and alcoholysis step, of which the last one is unsatisfactory due to the Walden inversion, the internal quaternary salt formation and elimination of the esterifying organic sulfonic acid (Robison et al., loc. cit., especially on page 2696, second column of this reference).

In view of the fact that 18α- and 18β-(R—CH$_2$—O)-17α-R$_2$-3-epi-20α-yohimbane-16β-carboxylic acid esters, particularly the lower alkyl 18-O-lower alkyl-reserpates and their 18α-epimers are of continued pharmacological interest, the need for a suitable procedure for their preparation on a larger scale is, therefore, obvious.

I have now found that the above 18α-(R—CH$_2$—O)-17α-R$_2$-3-epi-20α-yohimbane-16β-carboxylic acid ester compounds are readily obtained by reacting an 18α- or 18β - (R—CO—O)-17α-R$_2$-3-epi-20α-yohimbane - 16β-carboxylic acid ester with a metal hydride reducing reagent in the presence of boron trifluoride and, if desired, converting a resulting salt into the free base or into another salt, and/or converting in a resulting compound the 16β-carboxylic acid ester group into another 16β-carboxylic acid ester group, and/or converting a resulting compound into an N-oxide thereof, and/or converting a resulting base or an N-oxide thereof into a salt, and/or separating a resulting mixture of isomers into the single isomers.

In the above starting material, the group of the formula R—CO—, in which R is hydrogen or an organic radical, is primarily the acyl radical of an aliphatic carboxylic acid, such as a lower aliphatic carboxylic acid, particularly lower alkanoyl, e.g., formyl, acetyl, propionyl, n-butyryl, isobutyryl, n-pentanoyl or n-heptanoyl. It may also represent the acyl radical of a substituted aliphatic carboxylic acid, such as the acyl radical of a carbocyclic aryl-lower aliphatic carboxylic acid, such as phenyl-lower alkanoyl, e.g. phenylacetyl, or the acyl radical of a lower aliphatic carboxylic acid substituted by a functional group, such as lower alkoxy-lower alkanoyl, e.g., methoxyacetyl, or any other acyl radical of a suitable organic carboxylic acid, such as the acyl radical of a carbocyclic aryl carboxylic acid, e.g. benzoyl.

Apart from the groups in the 16β-, 17α- and 18-position, the compounds of the present invention may contain additional substituents. Thus, substituents of the positions of the aromatic nucleus, i.e., ring A of the molecule, more specifically the 9-position, the 10-position, the 11-position and/or the 12-position, are, for example, aliphatic hydrocarbon radicals, such as lower alkyl, etherified hydroxy, particularly lower alkoxy, as well as carbocyclic aryl-lower alkoxy or lower alkylenedioxy, esterified hydroxy, particularly halogeno, etherified mercapto, such as lower alkylmercapto, amino, such as disubstituted amino, or any other suitable substituent. These substituents, particularly aliphatic hydrocarbon radicals, such as lower alkyl, may also be attached to positions available for substitution in other nuclei, particularly of the heterocyclic nucleus C, more specifically to the 5- and/or 6-position.

The starting materials used in the above procedure are primarily represented by the formula

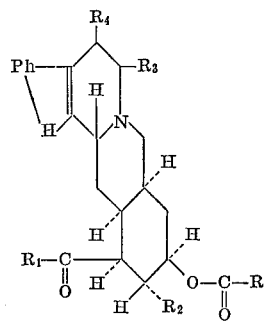

and their 18α-O—CO—R epimers, in which Ph is a 1,2-phenylene radical, R$_1$ an etherified hydroxy group, R$_2$ lower alkoxy, cyano or N-lower alkanoyl-N-lower alkyl-amino, R hydrogen or an organic radical, and each of the groups R$_3$ and R$_4$ hydrogen or lower alkyl.

The 1,2-phenylene radical Ph representing the hexacyclic carbocyclic aryl portion, i.e., ring A of the pentacyclic ring system, is unsubstituted or substituted by one or more than one of the same or of different substituents. The latter, which may substitute the 9-, 10-, 11- and/or 12-position, are particularly lower alkyl, e.g., methyl, ethyl, n-propyl, isopropyl or n-butyl, lower alkoxy, e.g., methoxy, ethoxy, n-propyloxy, isopropyloxy, n-butyloxy or isobutyloxy, monocyclic carbocyclic aryl-lower alkoxy, e.g. benzyloxy, diphenylmethoxy or 2-phenylethoxy, halogeno, e.g. fluoro, chloro or bromo, lower alkyl-mercapto, e.g. methylmercapto or ethylmercapto, amino or di-lower alkyl-amino, e.g. dimethyl-amino, N-ethyl-N-methylamino or diethyl-amino. A substituent may also be attached to two adjacent positions of the 1,2-phenylene radical and form a fused-on ring; such substituents may be represented, for example, by lower alkylenedioxy, e.g. methylenedioxy or 1,1-ethylenedioxy.

The 1,2-phenylene radical Ph is preferably represented by 1,2-phenylene, (lower alkyl)-1,2-phenylene, (lower alkoxy)-1,2-phenylene, (phenyl-lower alkoxy)-1,2-phenylene, (lower alkylenedioxy)-1,2-phenylene, (halogeno)-1,2 - phenylene, (lower alkyl - mercapto) - 1,2 - phenylene, (amino)-1,2-phenylene, (di-lower alkylamino)-1,2-phenylene or (halogeno)-(lower alkoxy)-1,2-phenylene.

The etherified hydroxy group $R_1$ is above all lower alkoxy, especially methoxy, as well as ethoxy, n-propyloxy, isopropyloxy, n-butyloxy, isobutyloxy, secondary butyloxy, n-pentyloxy, isopentyloxy, n-hexyloxy or n-heptyloxy, as well as monocyclic carbocyclic aryl-lower alkoxy, e.g., benzyloxy, 1-phenylethoxy or 2-phenylethoxy, lower alkoxy-lower alkoxy, in which the two oxygen atoms are separated by at least two carbon atoms, particularly 2-lower alkoxy-ethoxy, e.g., 2-methoxyethoxy or 2-ethoxy-ethoxy, 2- or 3-lower alkoxy-propyloxy, e.g., 2-methoxy-propyloxy, 3-methoxy-propyloxy or 3-ethoxy-propyloxy, or N,N-di-substituted amino-lower alkoxy, in which the oxygen is separated from the nitrogen by at least two carbon atoms, such as di-lower alkylamino-lower alkoxy, particularly 2-di-lower alkylamino-ethoxy, e.g., 2-dimethylamino-ethoxy or 2-diethylamino-ethoxy, 2- or 3-di-lower alkylamino-propyloxy, e.g. 2-dimethylamino-propyloxy 3 - dimethylamino - propyloxy or 3-diethylamino-propyloxy or alkylene-imino-lower alkoxy, particularly 2-(alkyleneimino)-ethoxy or 3-(alkyleneimino)-propyloxy, in which alkylene has from four to seven chain carbon atoms, e.g. 2-pyrrolidino-ethoxy, 2-piperidinoethoxy or 3-piperidino-propyloxy.

The 17α-substituent $R_2$ stands for lower alkoxy, above all methoxy, as well as ethoxy, n-propyloxy, isopropyloxy, n-butyloxy or isobutyloxy, cyano, or N-lower alkanoyl-N-lower alkyl-amino, e.g. N-acetyl-N-methylamino.

Apart from representing hydrogen, the group R is, for example, an aliphatic radical, particularly lower alkyl having preferably from one to four carbon atoms, especially methyl, as well as ethyl, n-propyl, isopropyl, n-butyl, isobutyl, n-pentyl, isopentyl, n-hexyl or n-heptyl, a carbocyclic aryl-lower aliphatic radical, such as phenyl-lower alkyl, e.g. benzyl or 2-phenylethyl, or a lower aliphatic radical substituted by a functional group, such as lower alkoxy-lower alkyl, e.g. 2-methoxy-ethyl or a carbocyclic aryl radical, e.g. phenyl.

The groups $R_3$ and $R_4$ in the previously-given formula, which stand primarily for hydrogen, may also represent lower alkyl, particularly methyl, as well as ethyl.

Especially useful starting materials are those of the formula

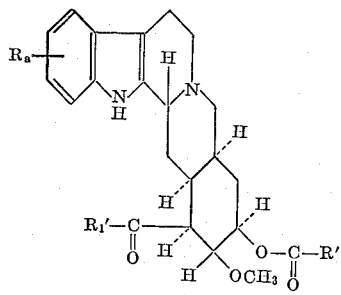

and their 18α-OCO—R' epimers, in which each of the groups $R_1'$ and $R_a$ is lower alkoxy, the latter being preferably attached to the 10- or 11-position, and R' is hydrogen or lower alkyl.

The boron trifluoride used in the process of the invention is preferably in the form of an etherate, especially the complex with diethyl ether.

A metal hydride reducing reagent is primarily an alkali metal borohydride, above all sodium borohydride, as well as lithium borohydride or potassium borohydride, but may also be an alkali metal aluminum hydride, e.g. lithium aluminum hydride.

The reaction of this invention is carried out under mild conditions, i.e. at room temperature, or, if necessary, while cooling, in the presence of a diluent or solvent respectively, such as an ether, e.g. diethyl ether, tetrahydrofuran or diethyleneglycol dimethylether, or a solvent mixture and/or in the atmosphere of an inert gas, e.g. nitrogen.

In order to recover the desired 18α- or 18β-(R—CH₂—O) - 17α - R₂ - 3 - epi - 20α - yohimbane-16β-carboxylic acid ester, the reaction mixture is worked up according to known procedures, for example, by quenching it with water, if necessary, with an aqueous solution of an acid, e.g. hydrochloric acid, or with an aqueous solution of a base, e.g. sodium hydroxide, and extracting the desired product, preferably from a basic reaction medium, with a suitable organic, sparingly water-miscible solvent, e.g. methylene chloride.

The preferred procedure of this invention comprises preparing lower alkyl 18-O-lower alkyl-reserpates, especially methyl 18-O-ethyl-reserpate, their 18α-epimers, and acid addition salts thereof, by reacting a mixture of a lower alkyl 18-O-(R'—CO)-reserpate or 18-epi-reserpate, in which R' is hydrogen or lower alkyl, especially methyl 18-O-acetyl-reserpate or 18-epi-reserpate, and the boron trifluoride diethyl ether complex with an alkali metal borohydride, especially sodium borohydride, in the presence of a diluent and under mild conditions, preferably while cooling, and, if desired, converting a resulting salt into the free base or into another salt, and/or, if desired, converting a resulting base into a salt thereof.

Compounds resulting from the above procedure may be obtained in the form of acid addition salts thereof. Such salts are preferably pharmaceutically acceptable acid addition salts, such as those with inorganic acids, e.g., hydrochloric, hydrobromic, sulfuric or phosphoric acid, or with carboxylic or sulfonic acids, e.g. acetic, tartaric, citric, succinic or maleic acid, methane sulfonic, ethane sulfonic, 2-hydroxy-ethane sulfonic, ethane-1, 2-disulfonic or p-toluene sulfonic acid. Other acid addition salts may serve as intermediates, for example, in the manufacture of other salts or in the purification of the free compounds, as well as for characterization and identification purposes. Acid addition salts primarily used for the latter are, for example, those with suitable inorganic acids, e.g. perchloric acid, those with acidic organic nitro compounds, e.g. picric, picrolonic or flavianic acid or those with metal complex acids, e.g. phosphotungstic, phosphomolybdic, chloroplatinic or Reinecke acid.

These salts may be converted into the free compounds, for example, by reacting the former with an alkaline reagent, such as ammonia, silver oxide or an ion exchange resin.

Resulting acid addition salts may be converted into other acid addition salts according to known methods, for example, by treatment with a suitable anion exchange reagent. An acid addition salt with an inorganic acid may also be converted into another acid addition salt by reacting it with a salt, e.g. sodium, barium or silver salt of an acid, in the presence of a suitable diluent, in which a resulting inorganic compound is insoluble and is thus removed from the reaction medium.

In a resulting compound, the 16β-esterified carboxyl group may be converted into another 16β-esterified carboxyl group. This may be achieved according to known methods, for example, by transesterification, such as treatment with an alcohol, primarily an alcohol of the formula $R_1$—OH, in the presence of a transesterifying reagent, such as a suitable Lewis base, for example, an alkali metal alcoholate, an alkali metal cyanide or a strong quaternary ammonium base, as well as a suitable Lewis acid, e.g. tungstic acid or p-toluene sulfonic acid, or by hydrolysis (for example, with an alkali metal hydroxide in the presence of an aqueous lower alkanol) and re-esterification (for example, with a suitable diazo-compound).

N-oxides of the compounds of the present invention may be formed according to known methods, for example, by treating a solution of a resulting compound in an inert solvent, or solvent mixture with an N-oxidizing reagent, such as hydrogen peroxide, ozone, persulfuric acid, or more especially a percarboxylic acid or persulfonic acid, e.g., perbenzoic or p-toluene persulfonic acid. In the N-oxidation reaction an excess of the oxidation reagent and/or an increase in temperature should be avoided in order to prevent oxidative degradation.

The free bases prepared according to the process of this invention, as well as the N-oxides thereof, may be converted into their acid addition salts, for example, by treating a solution of the base in a suitable solvent with the acid or a solution thereof, or with a suitable anion exchange preparation, and isolating the resulting salt. The salts may also be obtained in the form of their hydrates or may contain solvent of crystallization, depending on the conditions used in the formation of the salts.

Mixtures of isomers are separated into the individual isomers by known methods. Thus, mixtures of racemates may be separated into the single racemates on the basis of physicochemical differences, for example, by fractionated crystallization, and racemates into antipodes, for example, via the salts with optically active acids.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

The starting materials are known and are prepared according to known procedures. For example, an $18\beta$-hydroxy-$17\alpha$-$R_2$-3-epi-$20\alpha$-yohimbane-$16\beta$-carboxylic acid ester, when reacted with a suitable derivative of an organic carboxylic acid R—CO—OH, for example, a halide, e.g. chloride, or the anhydride thereof, preferably in the presence of a liquid organic base, e.g. pyridine, yields the $18\beta$-(R—CO—O)-$17\alpha$-$R_2$-3-epi-$20\alpha$-yohimbane-$16\beta$-carboxylic acid ester starting material. The ester in which R is hydrogen, is prepared by allowing an $18\beta$-hydroxy-$17\alpha$-$R_2$-3-epi-$20\alpha$-yohimbane-$16\beta$-carboxylic acid ester to stand in the presence of concentrated formic acid. The $18\alpha$-compounds are prepared in the analogous manner.

The compounds prepared according to the process of the present invention have sedative and tranquilizing effects; the latter are of quick onset, and the activity is of definite duration, thus making the recovery after treatment more complete and easily controllable. It has also been found that the acid addition salts of these compounds are water-soluble substances, and are, therefore, extremely useful in the preparation of aqueous solutions for injection and aqueous oral preparations, e.g. elixirs and the like, as well as for veterinary use. These compounds are, therefore, primarily used as sedative and tranquilizing agents to relieve states of hyperactivity, tension and agitation, as, for example, associated with mental disturbances, anxiety and the like. They are also useful in claiming laboratory test anmials, such as monkeys, dogs, cats and the like, as well as in the veterinary field to quiet animals, particularly chickens, turkeys and the like, as well as other domestic animals to facilitate handling during vaccination, shipment or slaughtering.

The following examples illustrate the invention and are not to be construed as being limitations thereon. Temperatures are given in degrees centigrade.

Example 1

A suspension of 4.58 g. of methyl 18-O-acetyl-reserpate in 50 ml. of diethyleneglycol dimethylether is chilled in an ice-bath; a total of 21.7 g. of a pre-chilled boron trifluoridediethyl ether complex (containing 47 percent or 10.15 g. of boron trifluoride) is added over a period of about five minutes while stirring. A brownish-red solution is obtained which is cooled and added dropwise to a cold, half-solid mixture of 0.76 g. of sodium borohydride in 25 ml. of diethyleneglycol dimethylether while stirring and cooling in an ice-salt (sodium chloride) bath; the addition is completed after 20 minutes. Stirring is continued while cooling in an ice-salt bath for 1½ hours and in an ice-bath for one hour; the temperature is then allowed to rise slowly to room temperature.

The resulting reaction mixture is added to 10 ml. of concentrated hydrochloric acid and 600 ml. of ice-water, whereupon a white precipitate is formed. The pH of the aqueous mixture is adjusted to about 11 by adding a 50% aqueous solution of sodium hydroxide and is then extracted with two portions of methylene chloride; the organic solution is washed with water, dried over sodium sulfate and concentrated to remove the methylene chloride. The liquid residue is treated with 700 ml. of water, whereupon a white precipitate is formed, which is filtered off, washed with water and dried; yield: 1.73 g. The filtrate is diluted with an additional quantity of water, followed by extraction with diethyl ether, and crystallization of the diethyl ether residue from isopropanol; yield from several crystallizations: 1.01 g. Re-extraction of the aqueous phase yields another 0.73 g. of product. Total yield: 3.47 g.

The fraction weighting 1.01 g. is chromatographed on aluminum oxide (neutral, activity grade II–III). The material eulated with methylene chloride, containing 0.2 percent of methanol is recrystallized from isopropanol to yield the pure methyl 18-O-ethyl-reserpate, M.P. 212–216°; its infrared absorption spectrum is identical with the spectrum of an original sample, it has the same Rf-value in the thin-layer chromatogram, and the mixed melting point is 214–217°.

Example 2

To a slurry of 4.58 g. of methyl 18-O-acetyl-reserpate in 50 ml. of diethyleneglycol dimethylether, thoroughly chilled in an ice-bath, is added in portions a total of 32.6 g. of the boron trifluoride-diethyl ether complex. A clear, red-brown solution is formed, which is added dropwise over a period of fifteen minutes to a mixture of 0.76 g. of sodium borohydride in 25 ml. of diethyleneglycol dimethylether. The resulting light yellow solution is stirred for an additional 1½ hours while cooling in ice; the ice-bath is then removed and replaced by a water-bath at 30–35° and stirring is continued for two hours at this temperature.

After cooling to room temperature, the reaction mixture is poured into a solution of 15 ml. of concentrated aqueous hydrochloric acid in 1,000 ml. of water while stirring. After ten minutes, the agitated acidic solution is treated with 40 ml. of a 50 percent aqueous solution of sodium hydroxide; the pH is about 11 and a tacky precipitate is formed. The organic material is extracted with 200 ml. of methylene chloride, then with 150 ml. and twice with 100 ml. of the same solvent; the organic extracts are washed with two portions of 100 ml. of water and are then extracted with 200 ml. and then twice with 100 ml. of an 0.5 molar solution of tartaric acid in water. The combined aqueous extracts are back-washed with 50 ml. of methylene chloride, and adjusted to pH 9 to 10 by adding 60 ml. of concentrated aqueous ammonia. The turbid basic aqueous mixture is extracted with 150 ml., 100 ml. and 75 ml. of methylene chloride; the combined organic solutions are back-washed with 100 ml. of water, dried over sodium sulfate and concentrated under reduced pressure to yield 4.22 g.

of the crude material. The latter is chromatographed on activated aluminum oxide (activity II–III), and the desired methyl 18-O-ethyl reserpate is eluted with methylene chloride, containing 0.2 percent of methanol, M.P. 212–216°.

In the above procedure, the methyl 18-O-acetyl-reserpate may be replaced by any other suitable 18β-(R—CO—O) - 17α - R$_2$ - 3-epi-20α-yohimbane-16β-carboxylic acid ester, in which R and R$_2$ have the previously-given meaning, such as one of the compounds having the previous formulae, especially lower alkyl 18-O-(R'—CO)-reserpate, e.g., methyl 18-O-formyl-reserpate, ethyl 18-O-acetyl-reserpate, methyl 18-O-propionyl-reserpate and the like, as well as methyl 18-O-methoxy-acetyl-reserpate, methyl 18-O-benzoyl-reserpate, methyl 18-O-phenylacetyl-reserpate, methyl 18-O-acetyl-deserpidate, methyl 18-O-acetyl-10-methoxy-deserpidate, methyl 18-O-acetyl-10-bromo-reserpate, methyl 18-O-acetyl-10-chloro-deserpidate,, methyl 18-O-acetyl-10-methyl-deserpidate, methyl 18-O-acetyl-11-methyl-mercapto-deserpidate, methyl 18-O-acetyl-12-methoxy-deserpidate, methyl 18-O-acetyl-10,11-methylenedioxy-deserpidate, methyl 18-O-acetyl-10-benzyloxy-deserpidate, methyl 18-O-acetyl-11-N,N-dimethylamino-deserpidate, methyl 18-O-acetyl-6-methyl-reserpate, 2-methoxyethyl 18-O-acetyl-reserpate, 2-N,N-dimethylaminoethyl 18-O-acetyl-reserpate, methyl 18-O-acetyl-17α- desmethoxy-17α-ethoxy-reserpate, methyl 18-O-acetyl-17α-cyano-17α-desmethoxy-reserpate, methyl 18-O-acetyl-17α-(N-acetyl-N-methyl-amino)-17α-desmethoxy-reserpate and the like. Upon reacting a mixture of one of these starting materials and boron trifluoride, preferably an etherate thereof, with a metal hydride reducing reagent, preferably an alkali metal borohydride, usually under mild conditions, if necessary, while cooling, and in the presence of a diluent, the desired 18β-(R—CH$_2$—O)-17α-R$_2$-3-epi-20α-yohimbane 16β-carboxylic acid esters, in which R and R$_2$ have the previously-given meaning, especially lower alkyl 18-O-lower alkyl-reserpates, e.g., methyl 18-O-methyl-reserpate, M.P. 235–237° (bz. ch.), methyl 18-O-ethyl-reserpate, M.P. 220–222° (bz. ch.), methyl 18-O-n-propyl-reserpate, M.P. 219–221° (bz. ch.), n-propyl 18-O-methyl-reserpate, M.P. 164–165° (bz. ch.), methyl 18-O-methyl-deserpidate, M.P. 114–115° (et.) and methyl 18-O-methyl-10-methoxy-deserpidate, where bz. ch. means a 1:3-mixture of benzene and cyclohexane and et. diethyl ether, as well as methyl 18-O-(2-methoxyethyl)-reserpate, methyl 18-O-benzyl-reserpate, methyl 18-O-(2-phenyl-ethyl)-reserpate, methyl 18-O-ethyl-deserpidate, methyl 18-O-ethyl-10-methoxy-deserpidate, methyl 18-bromo-18-O-ethyl-reserpate, methyl 10-chloro-18-O-ethyl-deserpidate, methyl 18-O-ethyl-10-methyl-deserpidate, methyl 18-O-ethyl-11-methylmercapto-deserpidate, methyl 18-O-ethyl-12-methoxy-deserpidate, methyl 18-O-ethyl-10,11-methylenedioxy-deserpidate, methyl 10-benzyloxy-18-O-ethyl-deserpidate, methyl 11-N,N-dimethylamino-18-O-ethyl deserpidate, methyl 18-O-ethyl-6-methyl-reserpate, 2-methoxyethyl 18-O-ethyl-reserpate, 2-N,N-dimethyl-aminoethyl 18-O-ethyl-reserpate, methyl 17α-desmethoxy-17α-ethoxy-18-O-ethyl-reserpate, methyl 17α-cyano-17α-desmethoxy-18-O-ethyl-reserpate, methyl 17α-(N-acetyl-N - methyl-amino)-17α-desmethoxy-18-O-ethyl-reserpate and the like, are formed.

*Example 3*

The compounds prepared according to the procedure of this invention, as illustrated in Example 1, may be converted into their acid addition salts, for example, according to the following methods:

A solution of 8.54 g. of methyl 18-O-ethyl-reserpate in 200 ml. of ethyl methyl ketone is treated with 2.35 g. of maleic acid in 20 ml. of ethyl methyl ketone. The reaction mixture is seeded with an original sample and is kept for 16 hours at −10° to −15°, after standing for four hours at room temperature. The resulting methyl 18-O-ethyl-reserpate maleate is filtered off, washed with ethyl methyl ketone and dried, M.P. 192–194° (with decomposition).

To a solution of 1.5 g. of methyl 18-O-methyl-reserpate in 25 ml. of acetone is added dropwise concentrated hydrochloric acid while stirring. The addition is carried out at room temperature and is interrupted after the solution becomes acidic to Congo Red test paper. Crystallization occurs upon scratching, the crystalline material is filtered off and washed with cold acetone. 1.5 g. of the methyl 18-O-methyl-reserpate hydrochloride is obtained, M.P. 237–242° (with decomposition).

*Example 4*

The compounds prepared according to the procedure of this invention, as illustrated in Example 1, may be converted into their N-oxides according to the following method:

A solution of 0.43 g. of methyl 18-O-methyl-reserpate in 40 ml. of methylene chloride is cooled to 0°, and, while stirring, 3 ml. of 0.339 M perbenzoic acid in chloroform is added over a period of seven minutes. The cold, pink solution is stirred for an additional fifteen minutes in an ice-bath, then extracted twice with a cold five percent aqueous sodium carbonate solution and washed with a saturated aqueous sodium chloride solution. The organic layer is separated, dried over sodium sulfate and evaporated to dryness under reduced pressure. The residue is dissolved in methylene chloride, and the solution is placed on a column of aluminum oxide (Woelm, neutral, activity II–III). The column is washed with methylene chloride and the product is eluted with methylene chloride containing one percent of methanol. The solvent is evaporated, and the residue is triturated with acetone to yield 0.11 g. of crystalline material, which is recrystallized by dissolving it in methylene chloride, adding acetone and evaporating most of the methylene chloride. The white, crystalline methyl 18-O-methyl-reserpate N-oxide melts at 238° with decomposition.

*Example 5*

4.5 g. of methyl 18-epi-reserpate formate are suspended in 50 ml. of diethyleneglycol dimethyl ether, the mixture is chilled in an ice bath and then treated over 3–5 minutes while stirring with 21.7 g. of pre-chilled 47% boron trifluoride diethyl ether complex. The alkaloid dissolves rapidly to yield a brownish-red solution containing a trace of dark, insoluble material.

A solution of 0.76 g. of sodium borohydride in 25 ml. of diethyleneglycol dimethyl ether is prepared in a 250 ml. round-bottomed 3-necked ground-joint flask fitted with a dropping funnel and reflux condenser vented through a tube and equipped for magnetic stirring. The borohydride solution is chilled in an ice-salt bath with stirring, and soon solidifies to a crystalline mush. With continued stirring, the cold alkaloid solution is added dropwise to the borohydride suspension. The solid rapidly dissolves and considerable gas is evolved during addition of the first few ml., but this soon subsides. The rest of the alkaloid solution is added over 15–20 minutes with continued stirring and ice-salt cooling. Stirring and ice-salt cooling are continued for 1.5 hours, and then cooling with ice alone for an additional hour. The ice bath is then removed and the solution is kept for 1 hour and 20 minutes with the temperature rising to ambient.

The light yellow solution is quenched with stirring in a mixture of 10 ml. of concentrated aqueous hydrochloric acid and 600 ml. of ice water; a white precipitate forms. After about 10 minutes, 50% aqueous sodium hydroxide solution is added to ca. pH 11; the white, granular precipitate is replaced by a yellowish, slightly tacky solid. The mixture is extracted with 2 portions of methylene chloride; the methylene chloride solution washed with water and dried over anhydrous sodium sulfate.

The filtered solution is concentrated to remove methylene chloride. The liquid residue, containing diethyleneglycol dimethyl ether is treated with 700 ml. of water precipitating a white solid. The mixture is chilled and filtered and the solid washed with water and dried, yielding fraction A, which predominantly contains unmodified starting material. Addition of more water to the filtrate followed by extraction with ether and crystallization of the ether residue from isopropyl alcohol yields fraction B, fraction C, and fraction D.

Re-extraction of the aqueous solution from above with ethyl acetate gives fraction E.

Fractions B, C and D were combined and chromatographed on neutral, activated alumina, activity grade II–III. The material eluted with a mixture of 0.2% of methanol in methylene chloride is recrystallized from isopropyl alcohol to give methyl 18-epi-O-methyl-reserpate melting at 240–242° with decomposition after recrystallization from benzene-cyclohexane 1:2.

*Example 6*

A thoroughly-chilled (ice bath) solution of 4.58 g. of methyl 18-O-acetyl-reserpate in 50 ml. of diethyleneglycol dimethyl ether containing 32.6 g. of 47% boron trifluoride in ether, is added over 15 min. with stirring to a cold (ice bath) suspension of 0.76 g. of sodium borohydride in 25 ml. of diethyleneglycol dimethyl ether. Stirring is continued for 1.5 hrs. at ice bath temperature, and then for an additional 2 hrs. at 30–35° C.

The mixture is then added with stirring to a mixture of 15 ml. of concentrated aqueous hydrochloric acid and 1 liter of water. After 10 minutes, the mixture is made basic with 40 ml. of 50% aqueous sodium hydroxide solution, precipitating a tacky solid. This mixture is extracted with several portions of methylene chloride and the organic solution is washed with water. The organic solution is then extracted with 0.5 M aqueous tartaric acid, and the aqueous solution is back-washed with methylene chloride. The aqueous solution is made basic with concentrated aqueous ammonia and the resulting mixture is extracted with methylene chloride. After back-washing the organic solution with water, it is dried over anhydrous sodium sulfate, filtered, and the filtrate is stripped to dryness. Thorough drying in a vacuum oven at 70° C. yields 4.22 g. of a hard, tan resin.

This resin is dissolved in a mixture of methylene chloride and benzene and chromatographed on activated alumina. The material eluted with 0.2% methanol in methylene chloride is recrystallized from isopropyl alcohol to give methyl 18-O-ethyl-reserpate contaminated by a small amount of methyl 18-O-acetyl-reserpate (identification by thin-layer chromatography).

There is isolated from other chromatogram fractions methyl 18-O-acetyl reserpate and methyl reserpate (identification by thin-layer chromatography).

*Example 7*

In the manner described in the previous examples the following compounds can be prepared by using equivalent amounts of the corresponding starting material:

Methyl 18-epi-O-ethyl-reserpate, M.P. 229–230 (dec., bz. ch.),
Methyl 18-epi-O-n-propyl-reserpate, M.P. 232–235 (dec., bz. ch.),
Methyl 18-epi-O-n-butyl-reserpate, M.P. 224–226° (bz. ch.),
Methyl 18-epi-O-(2-hydroxy-ethyl)-reserpate, M.P. 237–239° (dec., bz. ch.),
Methyl 18-epi-O-(2-methoxy-ethyl)-reserpate, M.P. 217–219° (et.),
Methyl 18-epi-O-benzyl-reserpate, M.P. 225–226° (dec., bz. ch.),
Ethyl 18-epi-O-ethyl-reserpate, M.P. 190–193° (et.),
n-Propyl 18-epi-O-n-propyl-reserpate, M.P. 192–195° (et.),
2-methoxy-ethyl 18-epi-O-methyl-reserpate, M.P. 151–154° (et.),
2-dimethylamino-ethyl 18-epi-O-methyl-reserpate, M.P. 202–205° (et.),
Methyl 18-epi-O-methyl-deserpidate, M.P. 123–127° (et.), and
Methyl 18-epi-O-methyl-10-methoxy-deserpidate, M.P. 233–236° (bz. ch.).

What is claimed is:
1. Process for the preparation of a member selected from the group consisting of 18α-(R—CH$_2$—O)-17α-R$_2$-3-epi-20α-yohimbane-16β-carboxylic acid esters, 18β-(R—CH$_2$—O)-17α-R$_2$-3-epi-20α-yohimbane - 16β - carboxylic acid esters, in which R is a member selected from the group consisting of hydrogen and an organic radical and R$_2$ is a member selected from the group consisting of lower alkoxy, cyano, and N-lower alkanoyl-N-lower alkylamino, which comprises reacting a member selected from the group consisting of an 18α-(R—CO—O)-17α-R$_2$-3-epi-20α-yohimbane-16β-carboxylic acid ester and an 18β-(R—CO—O)-17α-R$_2$-3-epi-20α-yohimbane-16β - carboxylic acid ester with a metal hydride reducing reagent in the presence of boron trifluoride.

2. Process according to claim 1, which comprises using as the starting material a member selected from the group consisting of a compound having the formula

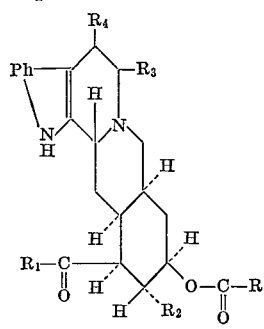

and its 18α-O—CO—R epimer, in which Ph is a 1,2-phenylene radical, R$_1$ etherified hydroxy, R$_2$ a member selected from the group consisting of lower alkoxy, cyano and N-lower alkanoyl-N-lower alkylamino, R is a member selected from the group consisting of hydrogen and an organic radical, and each of the groups R$_3$ and R$_4$ is a member selected from the group consisting of hydrogen and lower alkyl.

3. Process according to claim 1, which comprises using as the starting material a compound, in which the group of the formula R—CO— is lower alkanoyl.

4. Process according to claim 1, which comprises using as the starting material a member selected from the group consisting of a compound having the formula

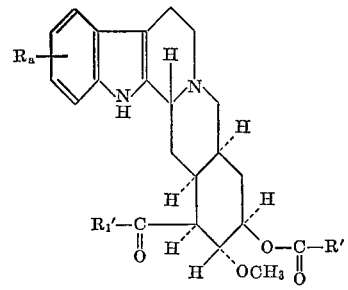

and its 18α-O—CO—R' epimer, in which each of the groups R$_1$' and R$_a$ is lower alkoxy, and R' is a member selected from the group consisting of hydrogen and lower alkyl.

5. Process according to claim 1, which comprises using as the starting material a lower alkyl 18-O-(R'—CO)-reserpate, in which R' is a member selected from the group consisting of hydrogen and lower alkyl.

6. Process according to claim 1, which comprises using as the starting material a lower alkyl 18-epi-O-(R'—CO)- reserpate, in which R' is a member selected from the group consisting of hydrogen and lower alkyl.

7. Process according to claim 1, which comprises using the boron trifluoride in the form of an etherate thereof.

8. Process according to claim 7, which comprises using the boron trifluoride-diethyl ether etherate.

9. Process according to claim 1, which comprises using an alkali metal borohydride as the metal hydride reducing reagent.

10. Process according to claim 9, which comprises using sodium borohydride as the alkali metal borohydride.

11. Process according to claim 1, which comprises using an alkali metal aluminum hydride as the metal hydride reducing reagent.

12. Process according to claim 1, which comprises carrying out the reaction under mild conditions.

13. Process according to claim 12, which comprises carrying out the reaction while cooling.

14. Process according to claim 1, which comprises carrying out the reaction in the presence of a diluent.

15. Process for the preparation of a member selected from the group consisting of lower alkyl 18-O-lower alkyl-reserpates and lower alkyl 18-epi-O-lower alkyl-reserpates, which comprises reacting a member selected from the group consisting of a lower alkyl 18-O-(R'—CO)-reserpate and a lower alkyl 18-epi-O-(R'—CO)-reserpate, in which R' is a member selected from the group consisting of hydrogen and lower alkyl, with an alkali metal borohydride in the presence of the boron trifluoride-diethyl ether complex and a diluent and under mild conditions.

16. Process according to claim 2, which comprises using as the starting material a compound, in which the group of the formula R'—CO— is lower alkanoyl.

References Cited by the Examiner

UNITED STATES PATENTS 3,126,388  3/1964  Robison et al. _____ 260—287

WALTER A. MODANCE, *Primary Examiner.*

JAMES A. PATTEN, *Assistant Examiner.*